(12) United States Patent
Cooley

(10) Patent No.: US 8,316,094 B1
(45) Date of Patent: Nov. 20, 2012

(54) SYSTEMS AND METHODS FOR IDENTIFYING SPAM MAILING LISTS

(75) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 274 days.

(21) Appl. No.: 12/691,228

(22) Filed: Jan. 21, 2010

(51) Int. Cl.
*G06F 15/16* (2006.01)

(52) U.S. Cl. .......................... 709/206; 709/207; 709/224

(58) Field of Classification Search ................ 709/206, 709/207, 224; 726/1, 2, 23, 32, 13
See application file for complete search history.

(56) References Cited

U.S. PATENT DOCUMENTS

| | | | | |
|---|---|---|---|---|
| 6,886,102 | B1* | 4/2005 | Lyle | 726/23 |
| 7,657,935 | B2* | 2/2010 | Stolfo et al. | 726/22 |
| 7,685,242 | B2* | 3/2010 | Pang | 709/206 |
| 7,779,080 | B2* | 8/2010 | Pang | 709/206 |
| 7,831,667 | B2* | 11/2010 | Gleeson et al. | 709/206 |
| 2005/0081059 | A1* | 4/2005 | Bandini et al. | 713/201 |
| 2005/0108340 | A1* | 5/2005 | Gleeson et al. | 709/206 |
| 2006/0168041 | A1* | 7/2006 | Mishra et al. | 709/206 |
| 2006/0265498 | A1* | 11/2006 | Turgeman et al. | 709/225 |
| 2006/0288076 | A1* | 12/2006 | Cowings et al. | 709/206 |
| 2007/0118904 | A1* | 5/2007 | Goodman et al. | 726/22 |
| 2007/0294352 | A1* | 12/2007 | Shraim et al. | 709/206 |
| 2008/0028029 | A1* | 1/2008 | Hart | 709/206 |
| 2008/0037546 | A1* | 2/2008 | Ishikawa et al. | 370/392 |
| 2008/0147808 | A1* | 6/2008 | Pang | 709/206 |
| 2009/0037469 | A1* | 2/2009 | Kirsch | 707/104.1 |
| 2009/0070872 | A1* | 3/2009 | Cowings et al. | 726/23 |
| 2009/0094333 | A1* | 4/2009 | Kyprianou | 709/206 |
| 2009/0157708 | A1* | 6/2009 | Bandini et al. | 707/100 |
| 2010/0077043 | A1* | 3/2010 | Ramarao et al. | 709/206 |
| 2010/0154058 | A1* | 6/2010 | Kay | 726/23 |
| 2010/0325728 | A1* | 12/2010 | Pang | 726/23 |
| 2010/0332975 | A1* | 12/2010 | Chang et al. | 715/256 |
| 2012/0131107 | A1* | 5/2012 | Yost | 709/206 |

\* cited by examiner

*Primary Examiner* — Ario Etienne
*Assistant Examiner* — Sargon Nano
(74) *Attorney, Agent, or Firm* — Advantedge Law Group

(57) ABSTRACT

A computer-implemented method for identifying spam mailing lists may include identifying a plurality of clients that receive e-mail messages. The computer-implemented method may also include, for each client in the plurality of clients, receiving, from the client, information identifying at least one e-mail message received by the client. The computer-implemented method may further include, for each client in the plurality of clients, recording the identifying information in a database. The computer-implemented method may additionally include identifying at least one mailing list by identifying at least one group of clients within the plurality of clients with similar patterns of identifying information. Various other methods, systems, and computer-readable media are also disclosed.

18 Claims, 6 Drawing Sheets

SYSTEMS AND METHODS FOR IDENTIFYING SPAM MAILING LISTS

BACKGROUND

The number of unsolicited bulk e-mails (also known as "spam") transmitted via the Internet has grown consistently over the past decade, with some researchers now estimating that more than 80% of e-mail represents spam. Spam e-mails annoy consumers, consume precious network bandwidth and resources, and may be used as a vehicle for propagating malware or committing fraud.

To help consumers avoid spam, anti-spam vendors employ a variety of techniques to identify and filter spam e-mails. The successful development and deployment of anti-spam technologies depends in part on understanding patterns in spam and spammer behavior. Many questions relevant to the fight against spam revolve around spam mailing lists (e.g., how large is the average spam mailing list, how frequently are new addresses added to a spam mailing list, whether new e-mail addresses are merged with old mailing lists, etc.). Unfortunately, spammers generally operate in secrecy and do not reveal information about their mailing lists. Accordingly, the instant disclosure addresses a need for identifying spam mailing lists.

SUMMARY

As will be described in greater detail below, the instant disclosure generally relates to systems and methods for identifying spam mailing lists. Embodiments of the instant disclosure may identify spam mailing lists by receiving information on spam sent to a plurality of clients and identifying groups of clients within the plurality of clients with similar spam information patterns (e.g., identifying a spam mailing list by identifying a group of clients that were sent a group of equivalent spam messages). For example, a method may include identifying a plurality of clients that receive e-mail messages and receiving from each client in the plurality of clients information identifying at least one e-mail message received by the client. The method may also include recording the identifying information in a database and identifying at least one mailing list by identifying at least one group of clients within the plurality of clients with similar patterns of identifying information.

Receiving the information identifying the e-mail message received by the client may occur in a variety of contexts. For example, the client may query an anti-spam signature database with information identifying an e-mail message to determine whether the e-mail message is spam. Thus, receiving the information identifying the e-mail message may entail receiving the query. In some examples, the query may include a signature corresponding to the e-mail message (e.g., a hash). In certain embodiments, receiving the identifying information may include receiving a variety of information, such as a unique identifier corresponding to the client, the client's location, an identification of an agent used by the client to send the identifying information, and/or a timestamp relating to the e-mail message.

Identifying a mailing list by identifying a group of clients within the plurality of clients with similar patterns may be performed in a variety of ways. For example, identifying the group of clients may include identifying a group of clients that have received a set of equivalent e-mail messages. Likewise, identifying the mailing list may include determining that the clients in the group of clients share similar patterns of identifying information because the clients in the group of clients belong to the mailing list. In some examples, identifying the group of clients may include performing a statistical analysis on the identifying information stored in the database. The statistical analysis may be performed using a variety of techniques, such as a k-means clustering, a fuzzy c-means clustering, a QT clustering, and/or a spectral clustering.

The method may also include analyzing each identified mailing list based, at least in part, on metadata corresponding to e-mail messages sent via the mailing list. The metadata may include various types of information, such as classifications of the e-mail messages, headers of the e-mail messages, and/or characteristics of exploits used in the e-mail messages.

In some examples, a system for identifying spam mailing lists may include an identification module, an aggregation module, and an analysis module. The identification module may be programmed to identify a plurality of clients that receive e-mail messages. The aggregation module may be programmed to receive, from each client in the plurality of clients, information identifying at least one e-mail message received by the client. The aggregation module may also be programmed to record the identifying information in a database. The analysis module may be programmed to identify at least one mailing list by identifying at least one group of clients within the plurality of clients with similar patterns of identifying information.

The aggregation module may receive the information identifying the e-mail message received by the client in a variety of contexts. For example, the client may query an anti-spam signature database with information identifying an e-mail message to determine whether the e-mail message is spam. The aggregation module may accordingly be programmed to receive the information identifying the e-mail message as part of receiving the query. In some examples, the query may include a signature corresponding to the e-mail message (e.g., a hash). In certain embodiments, the aggregation module may be programmed to receive various types of information as part of receiving the identifying information. Such information may include a unique identifier corresponding to the client, the client's location, an identification of an agent used by the client to send the identifying information, and/or a timestamp relating to the e-mail message.

The analysis module may use a variety of approaches to identify a mailing list by identifying a group of clients within the plurality of clients with similar patterns. For example, the analysis module may be programmed to identify the group of clients by identifying a group of clients that have received a set of equivalent e-mail messages. Likewise, the analysis module may be programmed to identify the mailing list by determining that the clients in the group of clients share similar patterns of identifying information because the clients in the group of clients belong to the mailing list. In some examples, the analysis module may be programmed to identify the group of clients by performing a statistical analysis on the identifying information stored in the database. The statistical analysis may be performed using one or more of a variety of techniques, such as a k-means clustering, a fuzzy c-means clustering, a QT clustering, and/or a spectral clustering.

The analysis module may also be programmed to analyze each identified mailing list based, at least in part, on metadata corresponding to e-mail messages sent via the mailing list. The metadata may include various types of information, such as classifications of the e-mail messages, headers of the e-mail messages, and/or characteristics of exploits used in the e-mail messages.

In some embodiments, a computer-readable-storage medium may include one or more computer-executable instructions that, when executed by at least one processor of a computing device, cause the computing device to identify a plurality of clients that receive e-mail messages, and receive, from each client in the plurality of clients, information identifying at least one e-mail message received by the client. The instructions may also cause the computing device to record the identifying information in a database and identify at least one mailing list by identifying at least one group of clients within the plurality of clients with similar patterns of identifying information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
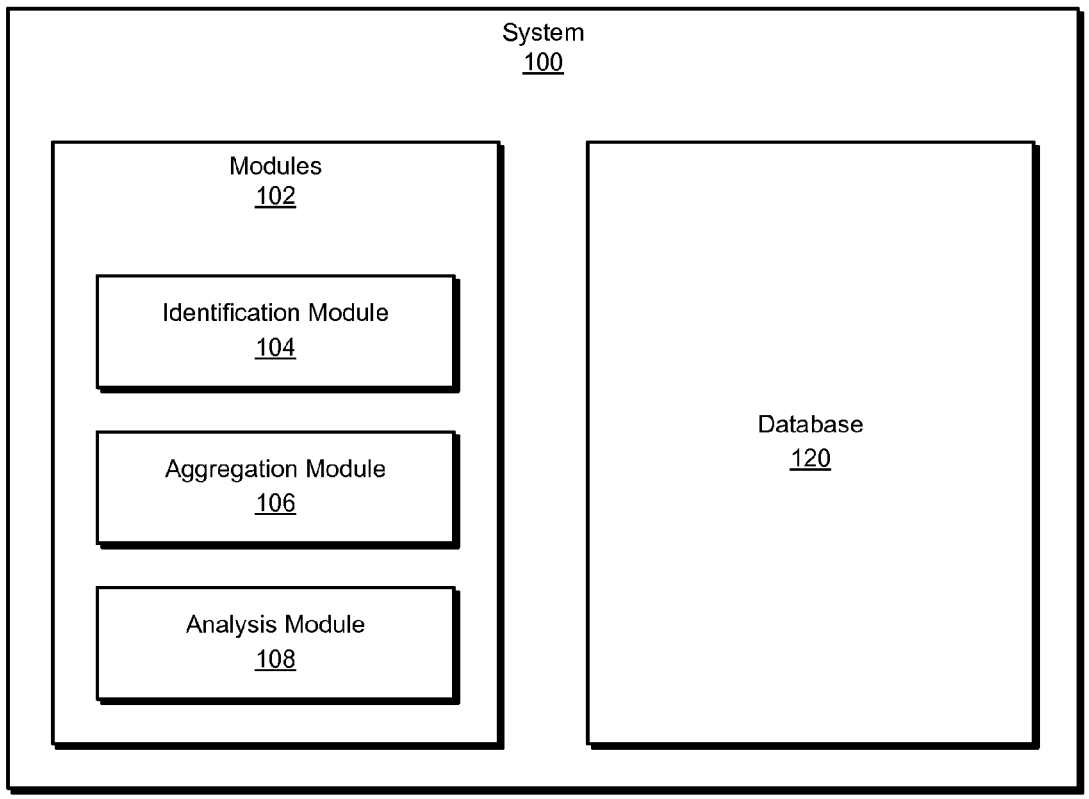
FIG. 1 is a block diagram of an exemplary system for identifying spam mailing lists.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for identifying spam mailing lists. Embodiments of the instant disclosure may identify spam mailing lists by receiving information on spam sent to a plurality of clients and identifying groups of clients within the plurality of clients with similar spam information patterns (e.g., identifying a spam mailing list by identifying a group of clients that were sent a group of equivalent spam messages). By identifying spam mailing lists based on information from numerous (e.g., potentially millions) of clients, embodiments of the instant disclosure may enable anti-spam vendors to gather valuable information regarding spamming behavior and to develop and/or refine anti-spam strategies.

Figure 2:
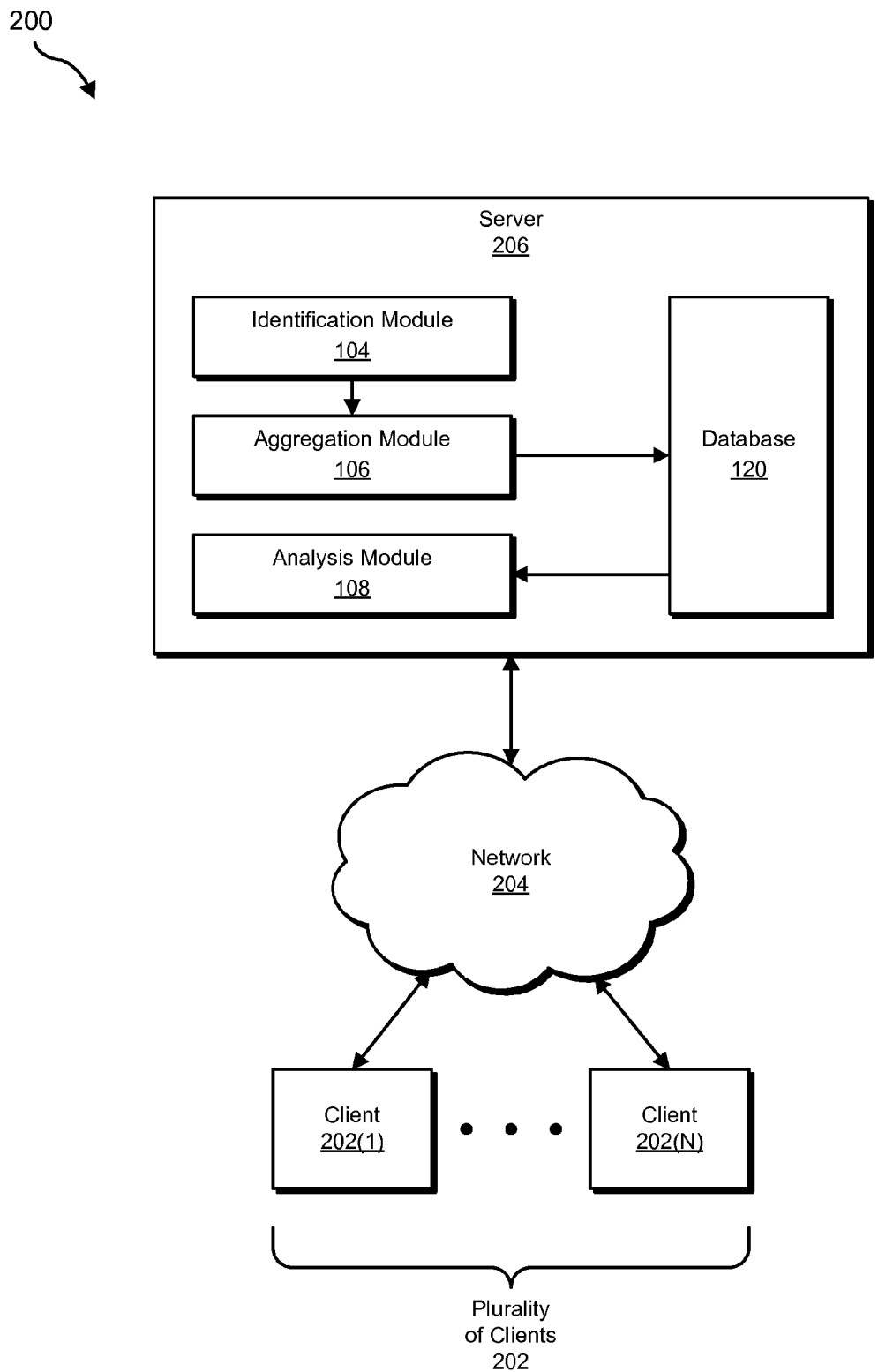
FIG. 2 is a block diagram of another exemplary system for identifying spam mailing lists.
Figure 3:
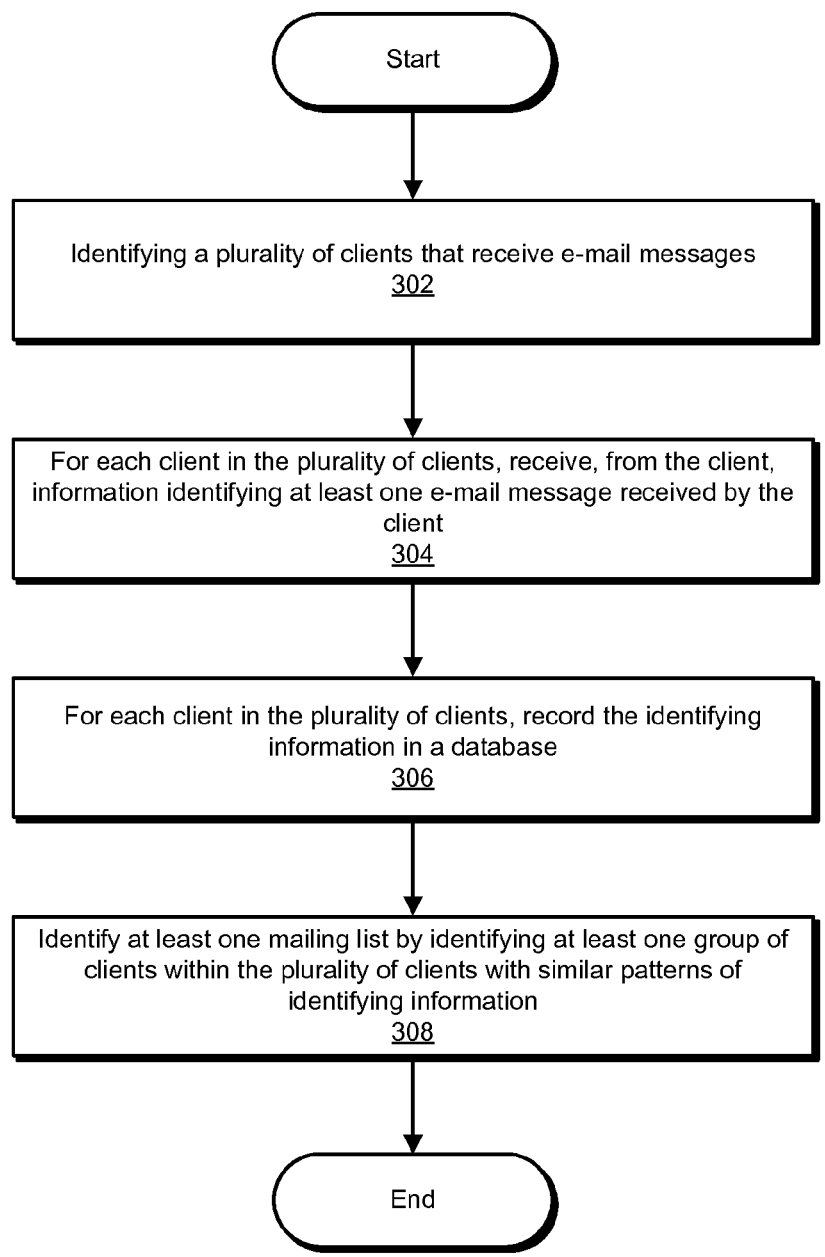
FIG. 3 is a flow diagram of an exemplary method for identifying spam mailing lists.
Figure 4:
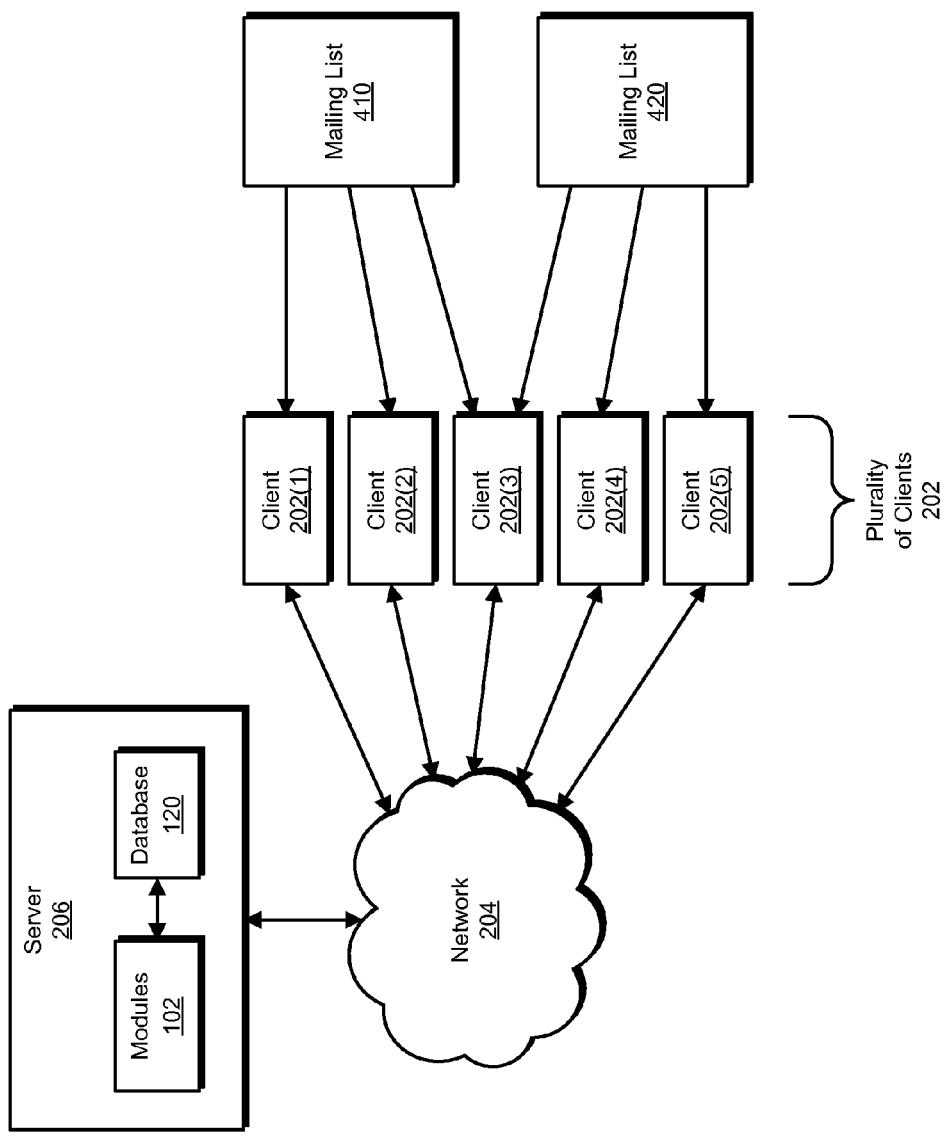
FIG. 4 is a block diagram of another exemplary system for identifying spam mailing lists.

The following will provide, with reference to FIGS. 1, 2, and 4, detailed descriptions of exemplary systems for identifying spam mailing lists. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for identifying spam mailing lists. As illustrated in this figure, exemplary system 100 may include one or more modules 102 for performing one or more tasks. For example, and as will be explained in greater detail below, exemplary system 100 may include an identification module 104 programmed to identify a plurality of clients that receive e-mail messages. Exemplary system 100 may also include an aggregation module 106 programmed to receive, from each client in the plurality of clients, information identifying at least one e-mail message received by the client.

In addition, and as will be described in greater detail below, exemplary system 100 may include an analysis module 108 programmed to identify at least one mailing list by identifying at least one group of clients within the plurality of clients with similar patterns of identifying information. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., plurality of clients 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a database 120. Database 120 may represent portions of a single database or computing device or a plurality of databases or computing devices. In some examples, database 120 may include an anti-spam signature database. For example, database 120 may include spam signatures and/or information relating to requests for spam signatures.

Database 120 in FIG. 1 may represent a portion of one or more computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment.

As shown in FIG. 2, system 200 may include a plurality of clients 202 in communication with a server 206 via a network 204. In one embodiment, and as will be described in greater detail below, modules 102 from FIG. 1 may program server 206 to identify a plurality of clients that receive e-mail messages. For example, identification module 104 may program server 206 to identify the plurality of clients 202. Modules 102 may also program server 206 to receive, from each client in the plurality of clients, information identifying at least one e-mail message received by the client. For example, aggregation module 106 may program server 206 to receive, from each client in the plurality of clients 202, information identifying at least one e-mail message received by the client (e.g., information identifying at least one e-mail message received by client 202(1), information identifying at least one e-mail message received by client 202(N), etc.). Modules 102 may also program server 206 to record the identifying information from each client in a database. For example, aggregation module 106 may program server 206 to record the identifying information received from each client in plurality of clients 202 in database 120.

Additionally, and as will be described in greater detail below, modules 102 may program server 206 to identify at least one mailing list by identifying at least one group of clients within the plurality of clients with similar patterns of identifying information. For example, analysis module 108 may program server 206 to identify at least one mailing list by identifying at least one group of clients within plurality of clients 202 with similar patterns of identifying information (e.g., by comparing identifying information received from the clients and recorded in database 120).

Each client in plurality of clients 202 generally represents any type or form of computing device capable of reading computer-executable instructions. Examples of client 202(1) include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of aggregating information on e-mails. Examples of server 206 include, without limitation, application servers and database servers configured to provide various database services and/or run certain software applications, anti-spam request servers, etc.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between the plurality of clients 202 and server 206.

FIG. 3 is a flow diagram of an exemplary computer-implemented method 300 for identifying spam mailing lists. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a plurality of clients that receive e-mail messages. For example, at step 302 identification module 104 may, as part of server 206 in FIG. 2, identify the plurality of clients 202. As used herein, the phrase "e-mail message" and the term "e-mail" generally may refer to any digital message and/or document that may be directed to a specified digital address, computing system, and/or person. For example, "e-mail" may refer to a digital message transmitted via the Simple Mail Transfer Protocol (SMTP). Additionally or alternatively, "e-mail" may refer to a digital message transmitted under a different protocol.

Identification module 104 may identify the plurality of clients in any suitable manner. For example, identification module 104 may read a configuration file that identifies the plurality of clients. Additionally or alternatively, identification module 104 may read from a database that includes references to the plurality of clients. In some examples, identification module 104 may identify the plurality of clients by receiving transmissions from the clients (e.g., identification module 104 may identify the plurality of clients as part of step 304).

At step 304 one or more of the systems described herein may receive, from each client in the plurality of clients, information identifying at least one e-mail message received by the client. For example, at step 304 aggregation module 106 may, as part of server 206 in FIG. 2, receive, from each client in the plurality of clients 202, information identifying at least one e-mail message received by the client.

Aggregation module 106 may receive information identifying an e-mail in a number of contexts. For example, a client in the plurality of clients may analyze e-mail messages to determine whether e-mail messages are spam and then report suspected spam (e.g., send information identifying the suspected spam). In another context, a client in the plurality of clients may query an anti-spam request server as to whether an e-mail message is spam (e.g., expecting a response that an e-mail message is "spam," "not spam," "gray" (indeterminate), etc.). For example, a client module (such as an e-mail client plug-in or an SMTP proxy) may query the anti-spam request server. In this context, aggregation module 106 may receive the identifying information as part of the query.

In some embodiments, the query may include a signature corresponding to the e-mail message. For example, the query may include a hash of the e-mail message (e.g., a cryptographic hash such as MD5, SHA1, etc.). In some examples, the query may include a hash taken of the e-mail message after a normalization step, enabling use of the hash to identify similar and/or equivalent e-mail messages. Additionally or alternatively, the query may include a fuzzy hash of the e-mail message (e.g., a NILSIMSA code based on the e-mail message).

Receiving the identifying information may include receiving various types of information in addition to or instead of signatures and/or hashes of email messages. For example, aggregation module 106 may receive a unique identifier corresponding to the client, a location of the client (e.g., an IP address, a region code, etc.), an identification of an agent used by the client to send the identifying information (e.g., an identification of an e-mail client and/or e-mail client plug-in), and/or a timestamp relating to the e-mail message (e.g., the time that the e-mail message was received by the client). As will be described in greater detail below, some or all of this information may be recorded in a database for later analysis.

At step 306 one or more of the systems described herein may record the identifying information of the e-mail message in a database. For example, at step 306 aggregation module 106 may, as part of server 206 in FIG. 2, record the identifying information received from each client in plurality of clients 202 in database 120.

The database may include any suitable storage system. For example, the database may include a relational database, a hierarchical database, a network database, a simple data structure, etc. Aggregation module 106 may record a variety of identifying information, such as a signature corresponding to the e-mail message (e.g., a hash), a classification of the status of the e-mail message (e.g., "spam," "not spam," "gray," etc.), a unique identifier of the client that sent the identifying information, a location of the client, an identification of an agent used by the client, a timestamp relating to the e-mail message, etc.

At step 308 one or more of the systems described herein may identify at least one mailing list by identifying at least one group of clients within the plurality of clients with similar patterns of identifying information. For example, at step 308 analysis module 108 may, as part of server 206 in FIG. 2, identify at least one mailing list by identifying at least one group of clients within the plurality of clients 202 with similar patterns of identifying information.

Analysis module 108 may perform step 308 in a variety of ways. As mentioned earlier and as will be explained in greater detail below, the identifying information associated with the clients (i.e., the information identifying the e-mail messages received by the clients) may include signatures of spam e-mails. Accordingly, analysis module 108 may identify the group of clients with similar patterns of identifying information by identifying a group of clients that received the same spam e-mails (e.g., a group of clients associated with the same group of signatures). Additionally, analysis module 108 may use other identifying information when assessing whether a group of clients has similar patterns of identifying information. For example, analysis module 108 may give weight to when clients received spam e-mails. In this example, analysis module 108 may identify the group of clients by identifying a group of clients that received the same spam e-mails in the same time period.

By way of example, FIG. 4 illustrates plurality of clients 202 with five clients: clients 202(1), 202(2), 202(3), 202(4), and 202(5). A spammer may use a mailing list 410 may send spam e-mail messages to clients 202(1), 202(2), and 202(3). Another spammer may use a mailing list 420 to send spam e-mail messages to clients 202(3), 202(4), and 202(5). Modules 102, as part of server 206 in FIG. 4, may program server 206 to infer the existence and targets of mailing lists 410 and 420. For example, analysis module 108 may identify clients 202(1), 202(2), and 202(3) as a group of clients with similar patterns of identifying information and infer that they belong to the same spam mailing list.

In some examples, analysis module 108 may identify the group of clients by identifying a group of clients that have received a set of equivalent e-mail messages. Using FIG. 4 as an example, a spammer may send five identical spam e-mail messages to each member of mailing list 410 (e.g., clients 202(1), 202(2), and 202(3)). As described earlier, each client may query a server to determine whether an e-mail message it receives is spam. As each client queries server 206, modules 102 may store information gathered from the queries in database 120. Analysis module 108 may then analyze data from database 120 to determine that clients 202(1), 202(2), and 202(3) received five identical spam e-mail messages. Likewise, analysis module 108 may determine that clients 202(3), 202(4), and 202(5) belong to a separate mailing list due to a separate set of spam e-mail messages being received by those clients.

As mentioned above, in some embodiments modules 102 may receive and store information that may be used to identify similar and/or substantially equivalent e-mail messages (e.g., a spam message may include random characters at the end of the message as part of a detection evasion strategy). For example, database 120 may include fuzzy hashes of e-mail messages. Accordingly, the set of equivalent e-mail messages used by analysis module 108 to identify a group of clients may include a set of similar and/or substantially equivalent e-mail messages.

In some examples, analysis module 108 may identify the mailing list by determining that the clients in the group of clients share similar patterns of identifying information because the clients in the group of clients belong to the mailing list. In other words, analysis module 108 may use certain data to infer a causal relationship between a mailing list and the similar patterns of identifying information. For example, analysis module 108 may determine that a group of clients that received many—but not all—of a set of spam messages in common do in fact belong to the same mailing list because each client in the group of clients tended to receive a given spam message at around the same time.

In some approaches, analysis module 108 may identify the group of clients with similar patterns of identifying information by performing a statistical analysis on the identifying information stored in the database (e.g., which clients received which spam messages at what times in which regions). Analysis module 108 may perform any appropriate statistical analysis. For example, analysis module 108 may perform a k-means clustering, a fuzzy c-means clustering, a QT clustering, and/or a spectral clustering.

As used herein, the phrase "k-means clustering" may refer to any method of cluster analysis which partitions data points into a predetermined number of clusters. For example, analysis module 108 may map the identifying information for each client onto a point with a number of dimensions equal to the number of distinct spam e-mail messages under consideration. Analysis module 108 may then assign a central point for each cluster and then progressively reassess the membership of each cluster and adjust the central point of each cluster based on the membership until reaching equilibrium (e.g., the membership of clusters no longer changes).

Likewise, as used herein, the phrase "fuzzy c-means clustering" may refer to any method of cluster analysis which assigns data points a degree of membership to each cluster based on their distance from the center of the cluster. For example, analysis module 108 may map the identifying information for each client onto a point with a number of dimensions equal to the number of distinct spam e-mail messages under consideration. Analysis module 108 may then assign a central point for each cluster and then progressively reassess the degree of membership of each data point to each cluster and adjust the central point of each cluster based on the membership of the data points until reaching equilibrium (e.g., until the distance moved by the central points falls below a predetermined threshold).

Furthermore, as used herein, the phrase "QT clustering" may refer to any method of cluster analysis which partitions data points into a plurality of clusters by serially assigning clusters based on the best (e.g., most dense) possible cluster with the remaining data points. For example, analysis module 108 may map the identifying information for each client onto a point with a number of dimensions equal to the number of distinct spam e-mail messages under consideration. Analysis module 108 may then build a candidate cluster starting from each point and create a cluster out of the best (e.g., most populated) candidate cluster. Analysis module 108 may repeat the process of finding the best candidate cluster for the remaining points until each data point is a member of a cluster.

Additionally, as used herein, the phrase "spectral clustering" may refer to any method of cluster analysis which partitions data points into a plurality of clusters by reducing the dimensionality of the data points. For example, analysis module 108 may map the identifying information for each client onto a point with a number of dimensions equal to the number of distinct spam e-mail messages under consideration. Analysis module 108 may then remap the data points onto a space of fewer dimensions in such a way as to minimize feature loss (e.g., by maximizing variance of the data points in the lower-dimensional mapping). Analysis module 108 may then apply another method of cluster analysis (such as one of the methods mentioned above) to the lower-dimensional mapping of the data points.

By identifying spam mailing lists, embodiments of the instant disclosure may provide insight into spamming patterns and/or spammer behavior. For example, by identifying spam mailing lists (and, in some examples, subsequently monitoring changes to the spam mailing lists), researchers and/or developers may better determine the number of spammers in existence, the size of spam mailing lists, how often spam mailing lists are updated, how often users are removed from spam mailing lists, how many times a spam message must bounce before a user is removed from a spam mailing list, and/or how many e-mails spammers send.

According to some embodiments, analysis module 108 may also analyze each identified mailing list based, at least in part, on metadata corresponding to e-mail messages sent via the mailing list. The metadata may include a variety of types of information. In some embodiments, the metadata may include results of analyzing the e-mail messages. For example, the metadata may include classification of the e-mail messages. The classification may include a statistically identified category relating to the content and/or purpose of the spam e-mail (e.g., "mortgage," "adult," "jobs," "phishing," etc.). As another example, the metadata may include characteristics of exploits used in the e-mail messages. In this example, the metadata may identify a specific exploit, characterize the exploit by techniques used in the exploit, characterize the exploit by results (e.g., the intentional and/or the incidental effects of the exploit), and/or place the exploit in a family of exploits. Additionally or alternatively, the metadata may include headers of the e-mail messages (such as the received header).

Analysis module 108 may perform this additional analysis with the metadata to a number of ends. For example, analysis module 108 may use the metadata analysis to refine inferences about the existence and membership of the mailing lists. Additionally or alternatively, analysis module 108 may perform the additional metadata analysis simply to generate statistics useful for learning about spammer behavior. Using FIG. 4 as an example, analysis module 108 may determine that a spammer uses mailing list 410 for both mortgage e-mails and BANK OF AMERICA phishing attacks. This information may help an anti-spam vendor recognize connections between commercial spam and exploits, potentially allowing the anti-spam vendor to trace the origins of the exploits since commercial spam typically has real-world contact information attached to it.

In addition to facilitating research and development surrounding spam patterns and spammer behaviors, identifying spam mailing lists may help to increase the efficiency of spam-blocking systems. For example, spam mailing lists may be used to warn spam-blocking systems in advance of spam (e.g., if some members of a spam mailing list receive a spam message, a signature of the spam message may be distributed to the remaining members of the spam mailing list). Spam mailing lists identified using the embodiments described herein may also be used in a variety of other contexts and may provide a variety of other advantages.

Figure 5:
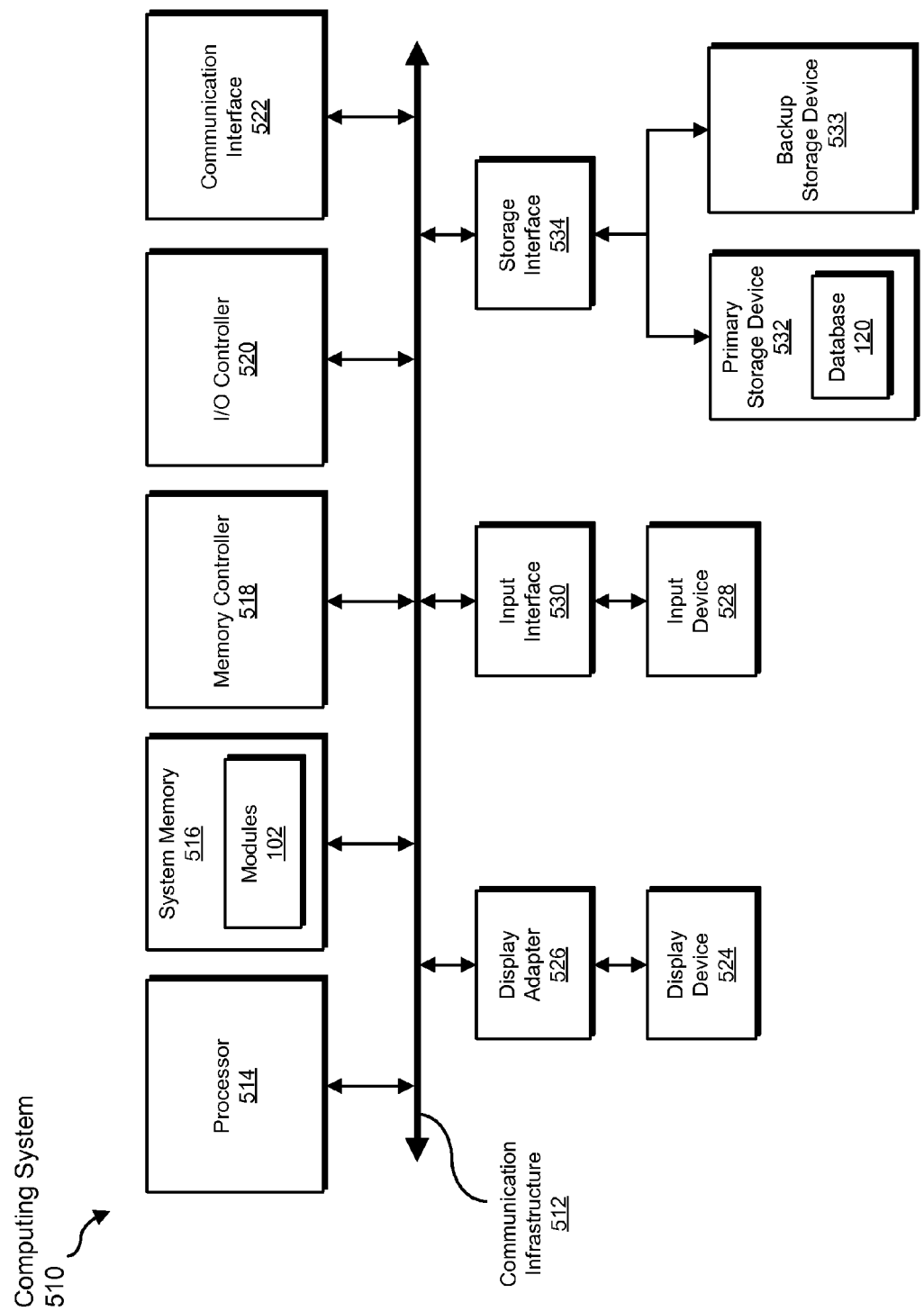
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, receiving, recording, determining, performing, and/or analyzing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, receiving, recording, determining, performing, and/or analyzing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, receiving, recording, determining, performing, and/or analyzing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, receiving, recording, determining, performing, and/or analyzing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, receiving, recording, determining, performing, and/or analyzing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, receiving, recording, determining, performing, and/or analyzing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
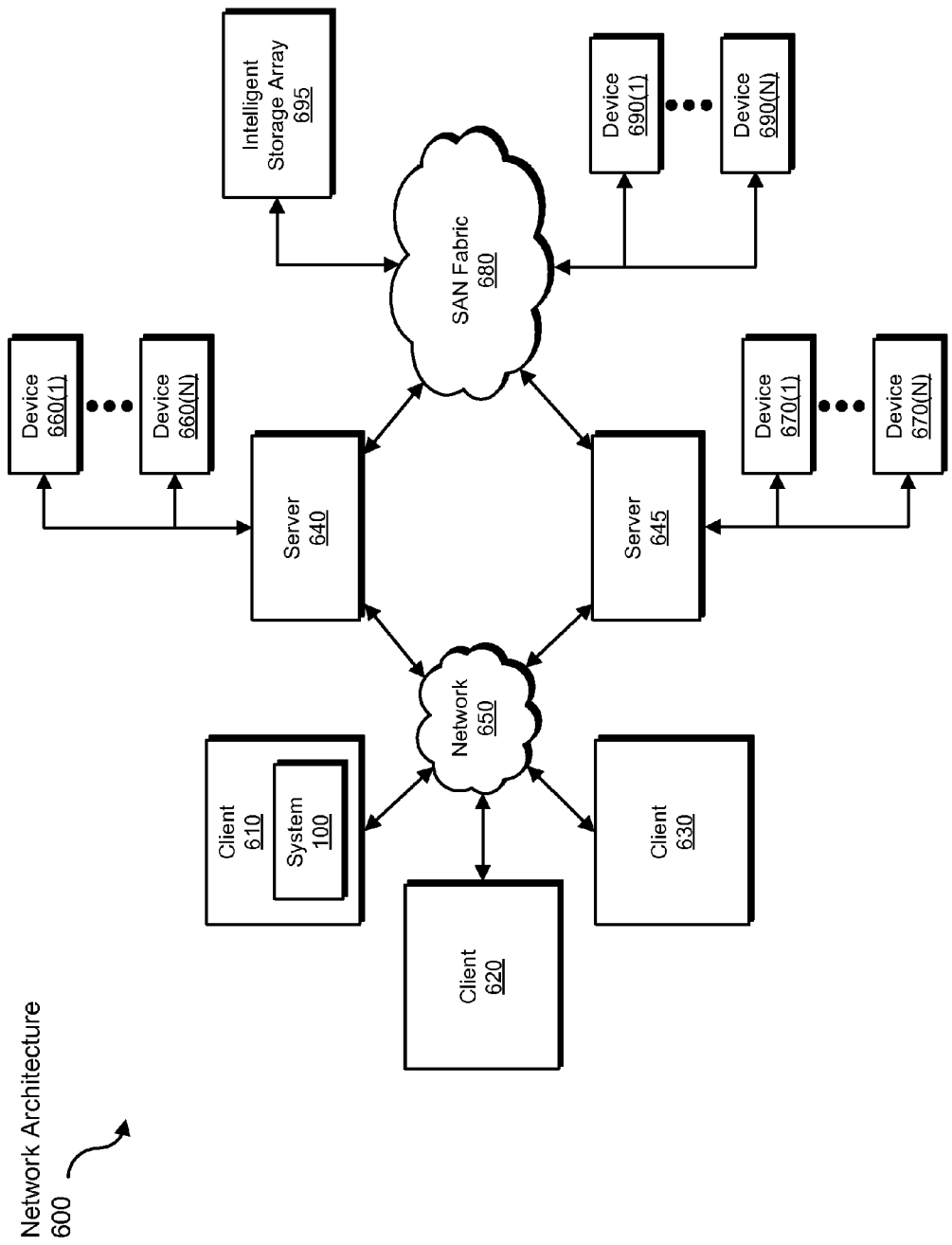
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, receiving, recording, determining, performing, and/or analyzing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for identifying spam mailing lists.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform an anti-spam request server into a spam mailing list identification system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for identifying spam mailing lists, at least a portion of the method being performed by a computing device comprising at least one processor, the method comprising:
    identifying a plurality of clients that receive e-mail messages; for each client in the plurality of clients:
    receiving, from the client, information identifying at least one e-mail message received by the client;
    recording the identifying information in a database; using the identifying information from the database to infer existence and targets of a spam mailing list, the targets of the spam mailing list being inferred by identifying at least one group of clients within the plurality of clients with similar patterns of identifying information;
    wherein identifying the group of clients with similar patterns of identifying information comprises performing a statistical analysis on the identifying information stored in the database to infer existence of the spam mailing list;
    determining that a first client in the group of clients received a new spam e-mail message; and
    using the spam mailing list to distribute a signature of the spam e-mail message to each client in the group of clients other than the first client.

2. The computer-implemented method of claim 1, wherein:
    receiving the information identifying the e-mail message received by the client comprises receiving a query from the client as to whether the e-mail message is spam;
    the query comprises a signature that corresponds to the e-mail message.

3. The computer-implemented method of claim 1, wherein inferring the targets of the spam mailing list comprises identifying, based on the identifying information in the database, a set of clients that each received a same spam e-mail.

4. The computer-implemented method of claim 3, wherein identifying the set of clients that each received the same spam e-mail comprises determining that each client in the set of clients received the same spam e-mail within a predefined time period.

5. The computer-implemented method of claim 1, wherein identifying the group of clients with similar patterns of identifying information comprises using fuzzy hashes of a set of equivalent e-mail messages to identify a group of clients that have received the set of equivalent e-mail messages.

6. The computer-implemented method of claim 1, wherein inferring the targets of the spam mailing list comprises determining that the clients in the group of clients share similar patterns of identifying information because the clients in the group of clients belong to the mailing list.

7. The computer-implemented method of claim 1, further comprising, for each identified spam mailing list, analyzing the identified mailing list based, at least in part, on metadata corresponding to e-mail messages sent via the mailing list.

8. The computer-implemented method of claim 7, wherein:
    the metadata corresponding to the e-mail messages sent via the mailing list comprises
    characteristics of exploits used in the e-mail messages;
    the method further comprises tracing an origin of the exploits.

9. A system for identifying spare mailing lists, the system comprising:
    an identification module programmed to identify a plurality of clients that receive e-mail messages;
    an aggregation module programmed to, for each client in the plurality of clients:
    receive, from the client, information identifying at least one e-mail message received by the client;
    record the identifying information in a database;
    an analysis module programmed to use the identifying information from the database to infer existence and targets of a spare mailing list, the targets of the spare mailing list being inferred by identifying at least one group of clients within the plurality of clients with similar patterns of identifying information;
    at least one processor configured to execute the identification module, the aggregation module, and the analysis module;
    wherein identifying the group of clients with similar patterns of identifying information comprises performing a statistical analysis on the identifying information stored in the database to infer existence of the spam mailing list;
    determining that a first client in the group of clients received a new spam e-mail message; and
    using the spam mailing list to distribute a signature of the spam e-mail message to each client in the group of clients other than the first client.

10. The system of claim 9, wherein the analysis module is programmed to use the spam mailing list to determine a current number of spammers who are sending spam e-mail messages.

11. The system of claim 9, wherein the analysis module is programmed to infer the existence of the spam mailing list by inferring a causal relationship between the mailing list and the similar patterns of identifying information.

12. The system of claim 9, wherein the analysis module is programmed to infer the targets of the spam mailing list by using the identifying information from the database to determine that each client in the group of clients tends to receive given spam e-mail messages at approximately the same time.

13. The system of claim 9, wherein the analysis module is programmed to use the spam mailing list to determine how many times spam e-mail messages to a particular client bounce before the particular client is removed from the spam mailing list.

14. The system of claim 9, wherein the analysis module is programmed to use the spam mailing list to determine how often the spam mailing list is updated.

15. The system of claim 9, wherein the analysis module is programmed to analyze identifying information stored in the database by performing a clustering analysis on the identifying information stored in the database to cluster, based on the identifying information, the clients into one or more groups representative of spam mailing lists.

16. The system of claim 15, wherein the analysis module is programmed to perform the clustering analysis by performing at least one of:
   a k-means clustering;
   a fuzzy c-means clustering;
   a QT clustering;
   a spectral clustering.

17. The system of claim 9, wherein the analysis module is further programmed to use the spam mailing list to determine how many e-mails are sent by a spammer using the spam mailing list.

18. A non-transitory computer-readable-storage medium comprising one or more computer-executable instructions that, when executed by at least one processor of a computing device, cause the computing device to:

identify a plurality of clients that receive e-mail messages;
for each client in the plurality of clients:
receive, from the client, information identifying at least one e-mail message received by the client;
record the identifying information in a database;
use the identifying information from the database to infer existence and targets of a spam mailing list, the targets of the spam mailing list being inferred by identifying at least one group of clients within the plurality of clients with similar patterns of identifying information;
wherein identifying the group of clients with similar patterns of identifying information comprises performing a statistical analysis on the identifying information stored in the database to infer existence of the spam mailing list;
determining that a first client in the group of clients received a new spam e-mail message; and
using the spam mailing list to distribute a signature of the spam e-mail message to each client in the group of clients other than the first client.

* * * * *

UNITED STATES PATENT AND TRADEMARK OFFICE
CERTIFICATE OF CORRECTION

PATENT NO. : 8,316,094 B1
APPLICATION NO. : 12/691228
DATED : November 20, 2012
INVENTOR(S) : Shaun Cooley Page 1 of 1

It is certified that error appears in the above-identified patent and that said Letters Patent is hereby corrected as shown below:

Claim 9, at column 16, lines 21 to 22, should read:

A system for identifying spam mailing lists, the system comprising:

Claim 9, at column 16, lines 30 to 35, should read:

an analysis module programmed to use the identifying information from the database to infer existence and targets of a spam mailing list, the targets of the spam mailing list being inferred by identifying at least one group of clients within the plurality of clients with similar patterns of identifying information;

Signed and Sealed this
Second Day of April, 2013

Teresa Stanek Rea
*Acting Director of the United States Patent and Trademark Office*